UNITED STATES PATENT OFFICE.

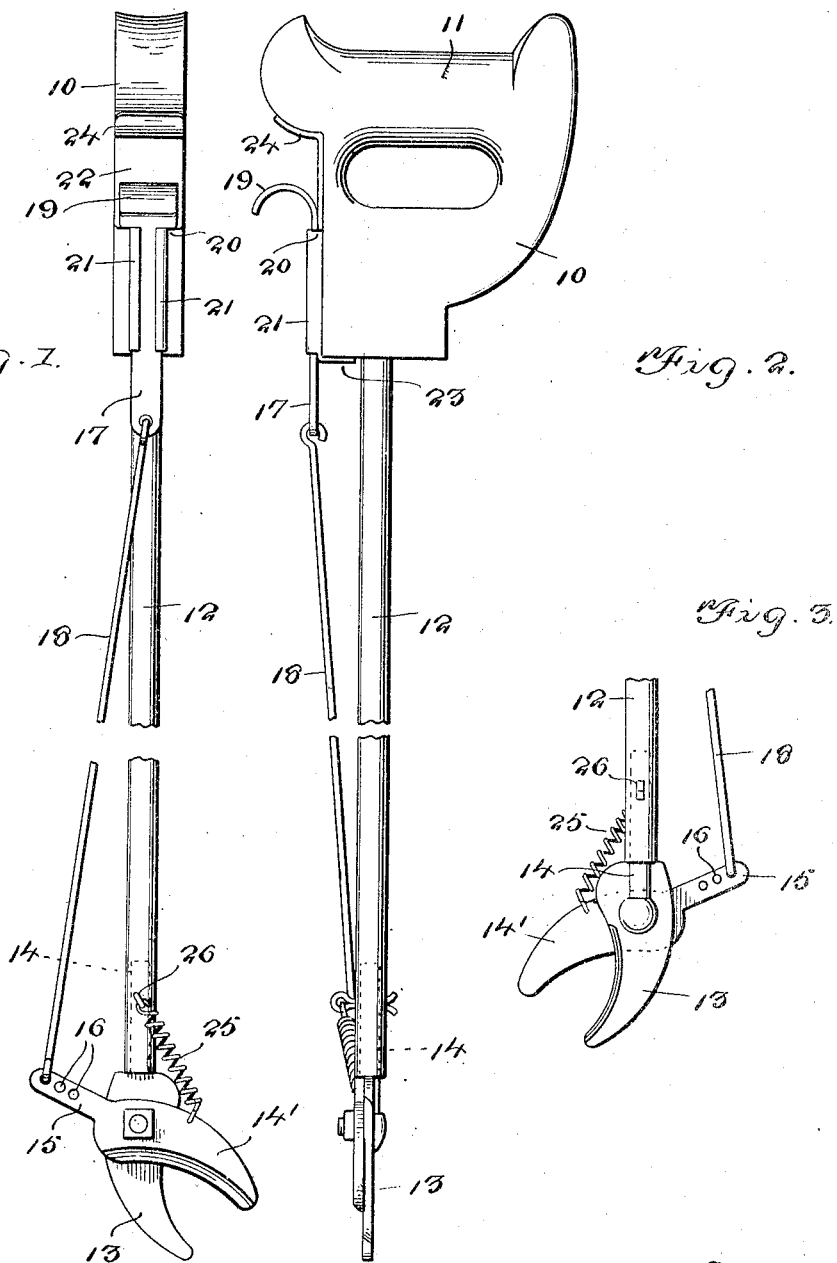

DAVID RUPPERT, OF WESTMINSTER, MARYLAND.

SHEARS.

1,333,578. Specification of Letters Patent. Patented Mar. 9, 1920.

Application filed April 11, 1919. Serial No. 289,430.

*To all whom it may concern:*

Be it known that I, DAVID RUPPERT, a citizen of the United States, residing at Westminster, in the county of Carroll and State of Maryland, have invented new and useful Improvements in Shears, of which the following is a specification.

This invention relates to shears and aims to provide a shear of novel construction, especially adapted for the purpose of thinning young corn and of removing the "suckers" or "shoots".

Another object of the invention is to provide a device of this character, which may be operated with one hand and for this purpose there is provided a novel form of operating member or trigger, which is slidable in guide flanges formed upon a plate carried by the handle, an extension of this plate acting as an abutment or stop, to limit the movement of the trigger in one direction and to prevent wear upon the handle, the guide flanges serving to limit the movement of the said trigger in an opposite direction.

Other objects and advantages of the invention will appear as the following description is read in connection with the accompanying drawings.

In the drawings:

Figure 1 is an elevation of the invention.

Fig. 2 is a view at right angles to Fig. 1.

Fig. 3 is a fragmentary view of the lower end of the shear, looking at the reverse side from that shown in Fig. 1.

Referring to the drawings in detail, wherein like characters of reference denote corresponding parts, the invention comprises a handle 10, which is formed with a hand-grip 11. Secured to and extending from the handle 10, is one end of a rod 12, the opposite end of this rod having secured thereto a shear blade 13. Various means may be employed for connecting the shear blade to the handle, but it is preferred to form the rod 12 of tubular construction and to provide the blade 13 with an extension 14, which is secured within the end of the rod 12.

Pivotally mounted upon the shear blade 13, is a second shear blade 14', the latter being provided with an extension 15, formed with spaced apertures 16.

Slidably mounted upon the handle 10, is a trigger 17, the latter being in the form of a slide and having one end pivotally connected to one end of a rod 18, the opposite end of this rod being pivotally connected to the extension 15 of the shear blade 14, through the medium of one of the apertures 16. The opposite end of the trigger 17 is formed with a relatively wide, outwardly curved portion 19, which provides a finger grip and which also provides oppositely located shoulders 20, which are adapted to abut the ends of inwardly turned guide flanges 21, formed on a plate 22. These flanges are so spaced from the plate as to receive the trigger 17 and to afford the said trigger a free sliding movement therein. One end of the plate 20 is provided with an inwardly turned right angular extremity 23, to provide means for securing this end of the plate to the handle. The opposite end of the plate is provided with an outwardly turned extremity 24, which bears against the grip 11 and provides means for securing this end of the plate to the handle. In addition, this outwardly turned extremity 24 acts as a stop to limit the movement of the trigger in an opposite direction and prevents wear upon the handle or the grip 11.

To insure the positive opening of the shear blades, there is provided a spring 25, one end of this spring being connected to the blade 14 and the opposite end to a lug 26 carried by the rod 12.

The invention is especially useful for the purpose intended, in that it permits of a rapid thinning of young corn and of the rapid removal of the shoots or suckers around the remaining stalks, without the necessity of the operator stooping or bending.

The invention is susceptible of various changes in its form, proportions and minor details of construction and the right is herein reserved to make such changes as properly fall within the scope of the appended claims.

Having described the invention, what is claimed is:

1. A device of the class described embodying a handle, pivoted shear blades secured to and spaced from said handle, a slidably mounted trigger carried by the handle, a rod connecting the trigger with one of the shear blades and a combined trigger guide and stop plate secured to the handle, said plate being formed of a single sheet of metal and having inwardly bent longitudinally extending flanges engaging said trigger and an outwardly turned extremity located in the path of the trigger.

2. A device of the class described embodying a handle, pivoted shear blades secured to and spaced from said handle, a slidably mounted trigger, a relatively wide finger piece formed on said trigger to provide oppositely extending shoulders, a rod connecting the trigger with one of the shear blades, a plate secured to the handle, inwardly bent longitudinally extending flanges formed on said plate and spaced from the latter to slidably receive the trigger and engage the shoulders of the finger piece to limit its movement in one direction and an outwardly turned extremity formed on the plate and spaced from the flanges to limit the movement of the trigger in an opposite direction.

In testimony whereof I affix my signature.

DAVID RUPPERT.